(12) United States Patent
Katsuyama

(10) Patent No.: US 11,203,244 B2
(45) Date of Patent: Dec. 21, 2021

(54) DAMPING CONTROL APPARATUS FOR VEHICLE

(71) Applicant: Toyota Jidosha Kabushiki Kaisha, Toyota (JP)

(72) Inventor: Etsuo Katsuyama, Hiratsuka (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 501 days.

(21) Appl. No.: 16/266,327

(22) Filed: Feb. 4, 2019

(65) Prior Publication Data
US 2019/0241038 A1 Aug. 8, 2019

(30) Foreign Application Priority Data

Feb. 5, 2018 (JP) .............................. JP2018-018371

(51) Int. Cl.
B60G 17/016 (2006.01)
B60G 17/019 (2006.01)
(Continued)

(52) U.S. Cl.
CPC ....... B60G 17/0164 (2013.01); B60G 17/018 (2013.01); B60G 17/01908 (2013.01); B60G 17/06 (2013.01); B60G 2400/0531 (2013.01); B60G 2400/0532 (2013.01); B60G 2400/0533 (2013.01); B60G 2400/104 (2013.01); B60G 2400/106 (2013.01); B60G 2500/10 (2013.01); B60G 2500/20 (2013.01)

(58) Field of Classification Search
CPC ........... B60W 30/18172; B60W 10/06; B60W 10/08; B60W 10/119; B60W 20/10; B60W 2520/28; B60W 2720/403; B60W 2520/263; B60W 2520/10; B60W 2540/18; B60W 2520/14; B60W 2520/125; B60W 2530/10; B60W 2710/0666; B60W 2710/083; B60W 50/0097; B60K 6/26; B60K 6/52; B60K 2006/268; B60K 2001/001; B60K 1/00; B60K 17/354; B60K 6/445; B60K 17/356; B60Y 2400/82; B60Y 2200/92; B60Y 2400/303; Y02T 10/62
See application file for complete search history.

(56) References Cited

U.S. PATENT DOCUMENTS

2013/0253764 A1* 9/2013 Kikuchi .............. B60T 8/17555
701/38
2017/0240017 A1* 8/2017 Vandersmissen ...........................
B60G 17/01908

FOREIGN PATENT DOCUMENTS

JP 2016-104605 A 6/2016

* cited by examiner

Primary Examiner — Geepy Pe
Assistant Examiner — Daniel Tyler Reich
(74) Attorney, Agent, or Firm — Dinsmore & Shohl LLP

(57) ABSTRACT

A damping control apparatus includes a control device for controlling actuators that generate forces acting between a vehicle body and wheels. The control device stores a single wheel model of a vehicle including a skyhook device having a damper, a spring and an inerter. The control device calculates a product of an acceleration detected by an acceleration sensor and an equivalent mass of the inerter, a product of a once integrated value of the acceleration and a damping coefficient of the damper, a product of a twice integrated value of the acceleration and, a spring constant of the spring as target damping forces to be applied to a sprung mass, and controls the actuators based on target generative forces based on the target damping forces.

4 Claims, 9 Drawing Sheets

(51) Int. Cl.
*B60G 17/018* (2006.01)
*B60G 17/06* (2006.01)

DAMPING CONTROL APPARATUS FOR VEHICLE

CROSS-REFERENCE TO RELATED APPLICATION

This application claims priority to Japanese Patent Application NO. JP2018-18371 filed on Feb. 5, 2018, incorporated by reference in its entirety.

BACKGROUND

1. Technical Field

The present disclosure relates, to a damping force control apparatus for a vehicle such as an automobile.

2. Description of the Related Art

As a damping control apparatus for a vehicle, a damping control apparatus that performs damping by skyhook control is well known. As is well known, in a damping control apparatus that performs damping by skyhook control, a force acting between a vehicle body and each wheel is controlled by an active suspension device or the like based on a single wheel vehicle model which has a sprung mass skyhooked via a virtual damper. A damping control apparatus that performs vibration suppression by reverse skyhook control is also known. In this damping control apparatus, a force acting between a vehicle body and each wheel is controlled by an active suspension device or the like based on a single wheel vehicle model which has an unsprung mass skyhooked via a virtual damper having a negative damping coefficient. According to these damping control apparatuses, it is possible to reduce the vibration of the vehicle body in the frequency range including a resonance frequency of the vehicle body, as compared to where the forces acting between the vehicle body and the wheels are not controlled.

Further, it is also well known that in performing damping by skyhook control, damping forces are generated by controlling braking/driving forces of wheels by utilizing the fact that braking/driving forces of the wheels are converted into vertical forces acting on the vehicle body by suspensions. An example of this type of damping control apparatus is described in, for example, Japanese Patent Application Laid-open No. 2016-104605 related to the application filed by the applicant of the present application, and according to this type of damping control apparatus, damping performance in a high frequency region is improved.

In such a conventional damping control apparatuses as described above, it is necessary to detect vertical accelerations of a vehicle body and a wheel in order to obtain a stroke speed of the wheel or the like necessary for damping control. However, in particular, an acceleration sensor for detecting a vertical acceleration of a wheel always needs to be provided on the wheel which vibrates upon receiving an excitation force from a road surface, and, accordingly, it is placed in a harsh environment, so that it is difficult to highly accurately detect a vertical acceleration of the wheel over a long period of time by the acceleration sensor.

It is also conceivable to estimate a vertical speed of a wheel or the Ike based on a vertical acceleration of a vehicle body. However, since it is not possible to accurately estimate a vertical velocity of a wheel or the like based on a vertical acceleration of a vehicle body, she vibration of the vehicle body cannot be precisely controlled using a vertical velocity of the wheel estimated based on the vertical acceleration of the vehicle body.

In particular, in a damping control apparatus that performs damping by skyhook control, vibration of the vehicle body can effectively be reduced at a resonance frequency of the vehicle body (the sprung mass) and frequencies in the vicinity thereof as compared to where a force acting between a vehicle body and each wheel is not controlled. However, the vibration of the vehicle body in a frequency range between a resonance frequency of the vehicle body and a resonance frequency of the wheel (unsprung mass) may rather deteriorate. On the other hand, in the damping control apparatus that performs damping by the reverse skyhook control, vibration of the vehicle body can effectively be reduced in a frequency range between the resonance frequency of the vehicle body and the resonance frequency of the wheel as compared to where a force acting between a vehicle body and each wheel is not controlled. However, the damping control effect on the vibration of the vehicle body at the resonance frequency of the vehicle body and the frequencies in the vicinity thereof is low as compared with the damping control apparatus that performs damping by the skyhook control.

SUMMARY

The present disclosure provides a damping control apparatus which is improved to effectively damp vibration of a vehicle body at a resonance frequency of the vehicle body and in the frequency range between the resonance frequency of the vehicle body and a resonance frequency of a wheel as compared to where a force acting between a vehicle body and each wheel is not controlled without requiring detecting a vertical acceleration of each wheel.

According to the present disclosure, a damping control apparatus for a vehicle is provided which has an acceleration detection device for detecting an acceleration of a vehicle body for a vibration mode of the vehicle body to be damped, actuators for generating forces acting between the vehicle body and wheels, and a control unit for controlling the actuators, and the control unit stores an equivalent mass of an inerter, a damping coefficients of a damper and a spring constant of a spring of a skyhook device that skyhooks a sprung mass of a single wheel vehicle model for the vibration mode via the inerter, the damper and the spring.

The control unit is configured to: calculate, as a target damping force to be applied to the sprung mass with respect to the vibration mode, a value obtained by multiplying by a control gain a sum of a product of an acceleration detected by the acceleration detecting device and the equivalent mass of the inerter, a product of a once integrated value of the acceleration and the damping coefficient of the damper, a product of a twice integrated value of the acceleration and the spring constant of the spring; calculate a target generative force of each actuator based on the target damping force; and control each actuator so that a force generated by the actuator becomes the corresponding target generative force.

According to the above configuration, a value obtained by multiplying by a control gain a sum of a product of an acceleration detected by the acceleration detecting device and the equivalent mass of the inerter, a product of a once integrated value of the acceleration and the damping coefficient of the damper, a product of a twice integrated value of the acceleration and the spring constant of the spring is calculated as a target damping force to be applied to the sprung mass. Further, a target generative force of each actuator is calculated based on the target damping force and each actuator is controlled so that a force generated by each actuator becomes the target generative force. Notably, the equivalent mass of the inerter is an equivalent mass calculated based on a moment of inertia of the inerter, a stroke of a suspension and a gear ratio of the inerter.

As explained in detail later, the value obtained by multiplying the sum of the above three products by the control gain is a value that can reduce vibration of the vehicle body caused by each wheel being disturbed from a road surface. In addition, this value is calculated based on an acceleration of the vehicle body without requiring an acceleration of each wheel.

Further, as explained in detail later, when each actuator is controlled so that a force generated by the actuator becomes the target generative force, it is possible to effectively damp the vibration of the vehicle body at the resonance frequency of the vehicle body and in a frequency range between the resonance frequency of the vehicle body and a resonance frequency of the wheel.

Therefore, according to the above configuration, it is possible to effectively damp vibration of the vehicle body at the resonance frequency of the vehicle body and in the frequency range between the resonance frequency of the vehicle body and the resonance frequency of the wheel as compared to where a force acting between a vehicle body and each wheel is not controlled without requiring detecting a vertical acceleration of each wheel.

In one aspect of the present disclosure, the control unit is configured to apply a high-pass filter to the acceleration, the once integrated value and the twice integrated value so that the same high-pass filter is applied to the acceleration, the once integrated value and the twice integrated value at least twice the same number of times.

According to the above aspect, a high-pass filter is applied to the acceleration, the once integrated value and the twice integrated value so that the same high-pass filter is applied to the acceleration, the once integrated value and the twice integrated value at least twice the same number of times. Therefore, adverse effects due to an integral offset can be eliminated by the high-pass filter. In addition, as compared to where different high-pass filters are applied to the acceleration and the like and where the same high-pass filter is applied to the acceleration and the like for different times, it is possible to reduce the possibility that a phase shift occurs in a damping force based on the acceleration, the once integrated value and the twice integrated value.

In another aspect of the present disclosure, the control unit is configured to apply the same low-pass filter to the acceleration, the once integrated value and the twice integrated value.

According to the above aspect, the same low-pass filter is applied to the acceleration, the once integrated value and the twice integrated value. Therefore, high-frequency noise can be eliminated, and the acceleration and the like can be processed so as to cope with delay in control by the control unit and the actuators. In addition, as compared to where different low-pass filters are applied to the acceleration, the once integrated value and the twice integrated value, it is possible to reduce the possibility that errors due to high frequency noise and deviation of control timing will occur in a damping force based on the acceleration, the once integrated value and the twice integrated value.

In another aspect of the present disclosure, the vibration mode includes at least two of a heave mode, a roll mode and a pitch mode; the actuators includes four wheel actuators provided corresponding to the left and right front wheels and the right and left rear wheels; and the control unit is configured to: calculate target generative forces of the wheel actuators for each mode; calculate a sum of the target generative forces of at least two modes for each wheel actuator as a final target generative force; and control each wheel actuator so that a force generated by the wheel actuator conform to the corresponding final target generative force.

According to the above aspect, the vibration mode of the vehicle body includes at least two of a heave mode, a roll mode and a pitch mode, and the actuators includes four wheel actuators provided corresponding to the left and right front wheels and the right and left rear wheels. Target generative forces of the wheel actuators for each mode are calculated a sum of the target generative forces of at least two modes for each wheel actuator is calculated as a final target generative force, and each wheel actuators is controlled so that a force generated by the wheel actuator conforms to the corresponding final target generative force.

Therefore, since the final target, generative force is calculated as the sum of the target generative forces of at least two modes for each wheel actuator, as compared to where the final target generative force is the target generative force of one mode, vibration of the vehicle body can be damped.

Other objects, other features and attendant advantages of the present disclosure will be readily understood from the description of the embodiments of the present disclosure described with reference to the following drawings.

DETAILED DESCRIPTION

Principle of the Present Disclosure Adopted in the Embodiment

Prior to describing the embodiment, the principle of the damping control in the present disclosure will be described with reference to FIG. 7 so as to facilitate understanding of the present disclosure.

<Vehicle Model>

Figure 7:
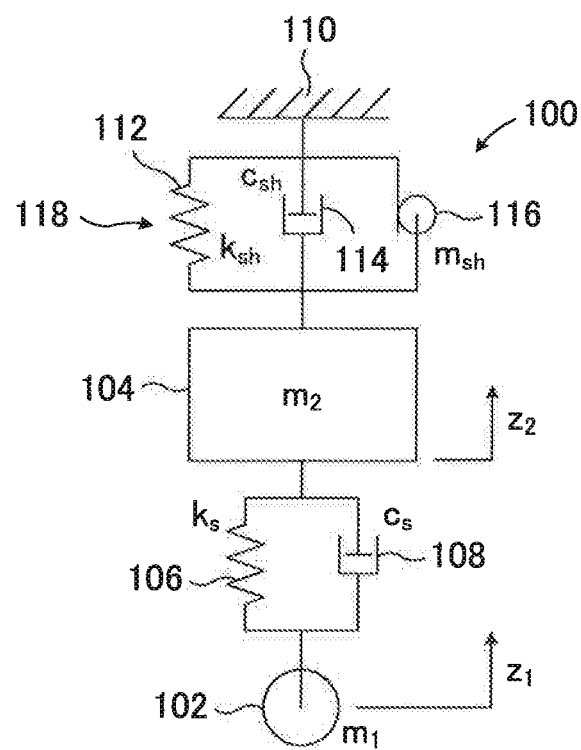
FIG. 7 is a view showing a single wheel vehicle model used in the damping control by the damping control apparatus of the present disclosure.

FIG. 7 shows a single wheel model 100 of a vehicle used in the damping control by the damping control apparatus of the present disclosure. In FIG. 7, reference numerals 102 and 104 indicate an unsprung mass and a sprung mass of a vehicle, respectively. Between the unsprung mass 102 and the sprung mass 104, a conventional suspension spring 106 and a damper 108 are provided. A skyhook device 118 having a skyhook spring 112, a damper 114 and an inerter 116 is provided between the sprung mass 104 and an imaginary support 110 at the sprung mass 104, and the sprung mass 104 is supported by skyhook by the skyhook device 118.

<Calculation of Target Control Force>

As shown in FIG. 7, masses of the unsprung mass 102 and the sprung mass 104 are denoted by $m_1$ and $m_2$, respectively, and their displacements are $z_1$ and $z_2$, respectively. Let a spring constant of the spring 106 and a damping coefficient of the damper 108 be $k_s$ and $c_s$, respectively. Further, let a spring constant of the spring 112, a damping coefficient of the damper 114, and an equivalent mass of the inerter 116 be $k_{sh}$, $c_{sh}$ and $m_{sh}$, respectively.

An equation of motion in the vertical direction of the sprung mass 104 is expressed by the following equation (1) with the Laplace operator as s, and a control force $F_c(s)$ given to the sprung mass 104 by the skyhook device 118 is expressed by the following equation (2). It can be understood from the following equation (2) that since the control force $F_c(s)$ consists only of the term proportional to the displacement $z_2$ of the sprung mass 104, the control force $F_c(s)$ applied to the sprung mass 104, that is, a target damping force can be calculated based only on the displacement $z_2$ of the sprung mass 104.

$$m_2 z_2 s^2 = (c_s s + k)(z_1 - z_2) + F_c(s) \quad (1)$$

$$F_c(s) = -(m_{sh} s^2 + c_{sh} s + k_{sh}) z_2 \quad (2)$$

Here, when dm, dc and dk are defined by the following equations (3) to (5) with e as a constant value, the above equation (2) can be rewritten as the following equation (6). It can be understood from the following equation (6) and the above equation (1) that in spite that the displacement $z_2$ of the sprung mass 104 is only required for calculation of a target damping force Fc, a relationship of a displacement $z_2$ of the sprung mass 104 with respect to a displacement of the unsprung mass 102 can be obtained.

$$dm = \frac{m_{sh} - em_2}{(1+e)m_2} \quad (3)$$

$$dc = \frac{c_{sh} - ec_s}{(1+e)c_s} \quad (4)$$

$$dk = \frac{k_{sh} - ek_s}{(1+e)k_s} \quad (5)$$

$$F_c(s) = -e(m_2 s^2 + c_s s + k_s) z_2 - (1+c)(dm\, m_2 s^2 + dc\, c_s s + dk\, k_s) z_z \quad (6)$$

By substituting the equation (6) into the equation (1) and solving for the displacement $z_2$ of the sprung, mass 104, the displacement $z_2$ is expressed by the following equation (7).

$$z_2 = \frac{\frac{c_s s + k_s}{1+e} z_1}{(1+dm)m_2 s^2 + (1+dc)c_s s + (1+dk)k_s} \quad (7)$$

As is well known, the displacement $z_2$ of the sprung mass 104 in a conventional general skyhook control is expressed by the following equation (8).

$$z_2 = \frac{(c_s s + k_s) z_1}{m_2 s^2 + c_s s + k_s} \quad (8)$$

From the comparison between the above equations (7) and 8), it can be seen that the skyhook device 118 shown in FIG. 7 can reduce the coefficient of the numerator of the equation (7). In particular, since the numerator is multiplied by $1/(1+e)$, by setting e to be a positive constant value, the displacement $z_2$ of the sprung mass 104 can be made smaller than the case where e is 0 or a negative value. That is, it is possible to reduce a vibration amplitude of the sprung mass 104 caused by a disturbance input from a road surface, thereby improving the ride comfort of the vehicle in a wide frequency range.

Further, dm, dc and dk included in the denominator of the above equation (7) are values that change inherent characteristics related to an inertia force, a damping force and a spring force of the suspension, respectively. As described above, dm, dc, and dk are represented by the above equations (3) to (5), respectively. Therefore, the equivalent mass $m_{sh}$ of the inerter 116, the damping coefficient $c_{sh}$ of the damper 114, and the spring constant $k_{sh}$ of the spring 112 only have to be set so that the inherent characteristics become desired characteristics.

In order to reduce the vibration of the sprung mass 104 as compared with the conventional general skyhook theory without changing the inherent characteristics, the equivalent mass $m_{sh}$, the damping coefficient $c_{sh}$, and the spring constant $k_{sh}$ only have to be set so that dm, dc and dk are all 0. That is, the equivalent mass $m_{sh}$, the damping coefficient $c_{sh}$, and the spring constant $k_{sh}$ only have to satisfy the following equations (9) to (11), respectively. In that case, since the second term of the above equation (6) becomes 0, the target damping force $F_c(s)$ is expressed by the following equation (12).

$$m_{sh} = em_2 \quad (9)$$

$$c_{sh} = ec_s \quad (10)$$

$$k_{sh} = ek_s \quad (11)$$

$$F_c(s) = -e(m_2 s^2 + c_s s + k_s) z_2 \quad (12)$$

In order to damp vibration of the sprung mass based on the above idea, it is necessary to know a vertical displacement of the sprung mass. However, since it is not easy to determine an absolute vertical displacement of the sprung mass, it is conceivable to detect a vertical acceleration of the sprung mass and calculate an integral value and a twice integral value of the vertical acceleration as a vertical speed and a vertical displacement of the sprung mass, respectively.

When calculating an integral value and a twice integral value of a detected vertical acceleration of the sprung mass as a vertical velocity and a vertical displacement of sprung mass, respectively, high-pass filters for eliminating integral offsets are necessary. Also, there are delays in the actual damping apparatus, and the delays can be represented by low-pass filters. Therefore, transfer functions corresponding to products of a high-pass filter and a low-pass filter are applied to the vertical acceleration, the vertical velocity, and the vertical displacement of the sprung mass.

Let the transfer functions for the vertical acceleration, vertical velocity and vertical displacement be $D2(s)$, $D1(s)$ and $D0(s)$, respectively, the target damping force $F_c(s)$ corresponds to the above equation (12) is expressed by the following equation (13).

$$F_c(s) = -e(m_2 D_2(s)s_2 + c_s D_1(s)s + k_s D_0(s))z_2 \quad (13)$$

By substituting the equation (13) into the equation (1) and solving for the displacement $z_2$ of the sprung mass 104, the displacement $z_2$ is expressed by the following equation (14).

$$z_2 = \frac{c_s s + k_s}{(1 + eD_2(s))m_2 s^2 + (1 + eD_1(s))c_s s + (1 + D_0(s))k_s} z_1 \quad (14)$$

Here, when the same high-pass filter and low-pass filter are applied to the vertical acceleration, vertical velocity and vertical displacement of the sprung mass so that the transfer functions $D2(s)$, $D1(s)$ and $D0(s)$ satisfy the following equation (15), the equation (14) is rewritten to the following equation (16). Notably, although it is not necessary to apply the high-pass filter to the vertical displacement, it is necessary to apply the high-pass filter to the vertical acceleration at least twice. Therefore, the high-pass filter is also applied to the vertical velocity and the vertical displacement at least twice.

$$D_2(s) = D_1(s) = D_0(s) \equiv D(s) \quad (15)$$

$$z_2 = \frac{c_s s + k_s}{(1 + eD(s))(m_2 s^2 + c_s s + k_s)} z_1 \quad (16)$$

$$= \frac{\frac{c_s s + k_s}{1 + eD(s)} z_1}{m_2 s^2 + c_s s + k_s}$$

From the above equations (8) and (18), it can be seen that by applying the same high-pass filters and low-pass filter to the vertical acceleration, the vertical velocity and the vertical displacement of the sprung mass, the numerator can be reduced while keeping the denominator the same as in the conventional general skyhook control. That is, it can be understood that the displacement $z_2$ of the sprung mass can be reduced without changing the denominator, so that a vibration amplitude of the sprung mass due to a disturbance input from a road surface can be reduced.

Embodiment

The embodiment of the present disclosure will now be described in detail with reference to the accompanying drawings.

Figure 1:
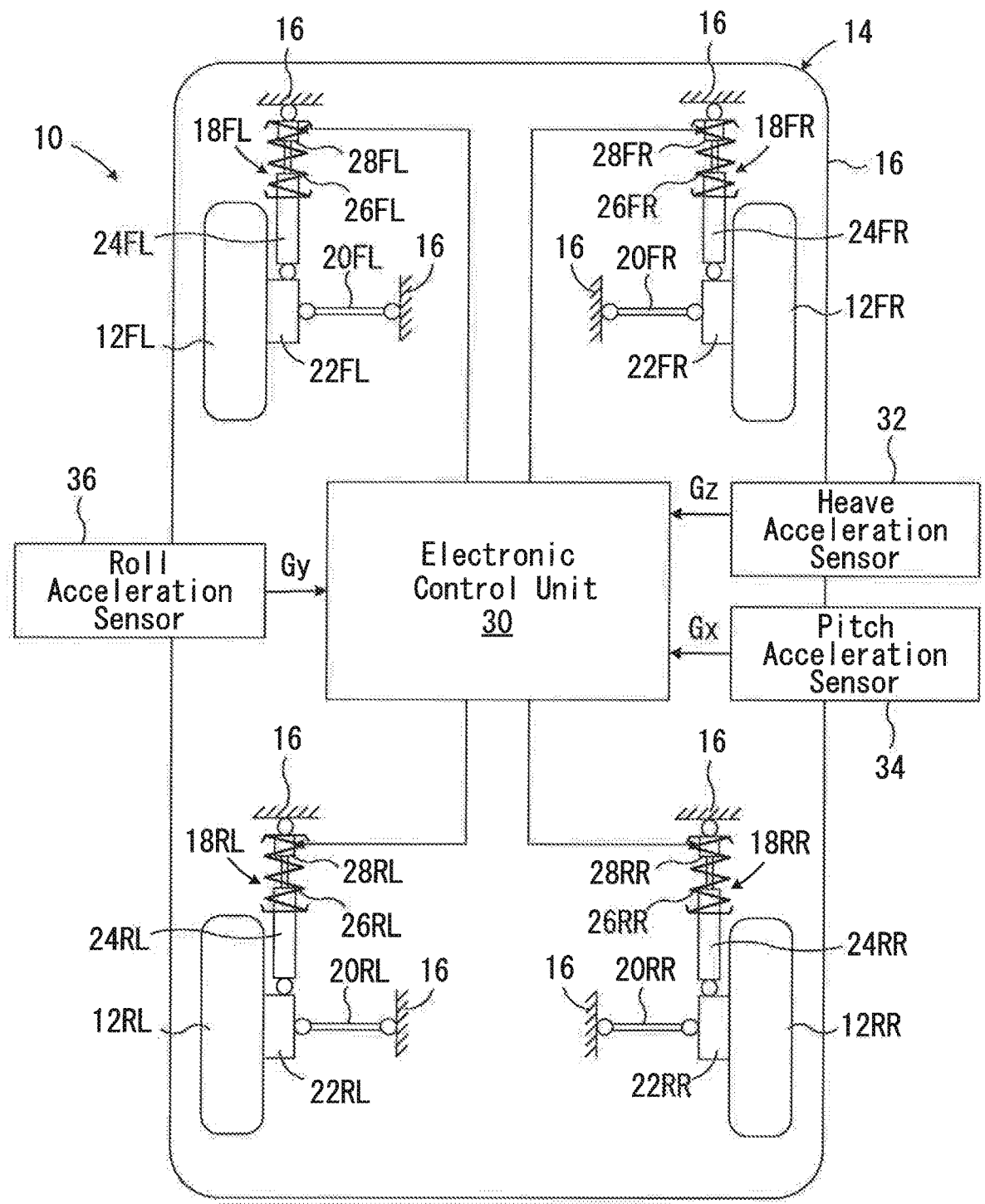
FIG. 1 is a schematic configuration diagram showing an embodiment of a damping control apparatus according to the present disclosure.

In FIG. 1, a damping control apparatus for a vehicle according to an embodiment of the present disclosure is indicated generally by reference numeral 10. The damping control apparatus 10 is applied to a vehicle 14 having left and right front wheels 12FL and 12FR serving as steered wheels and left and right rear wheels 12RL and 12RR serving as non-steered wheels. The vehicle 14 has front wheel suspensions 18FL and 18FR for suspending the front wheels 12FL and 12FR from a vehicle body 16, respectively, and rear wheel suspensions 18RL and 18RL for suspending the rear wheels 12RL and 12RR from the vehicle body 16, respectively.

The front wheel suspensions 18FL and 18FR include suspension arms 20FL and 20FR, respectively, and the rear wheel suspensions 18RL and 16RR include suspension arms 20RL and 20RR, respectively. In FIG. 1, although the suspension arm 20FL to 20RR are shown one for each suspension, a plurality of these arms may be provided for each suspension.

The front wheels 12FL and 12FR are supported by the wheel support members 22FL and 22FR, respectively, rotatably around the rotation axes (not shown), and the wheel support members 22FL and 22FR are connected to the vehicle body 16 by the suspension arms 20FL and 20FR, respectively. Likewise, the rear wheels 12RL and 12RR are supported by the wheel support members 22RL and 22RR, respectively, rotatably around a rotation axes (not shown), and the wheel support members 22RL and 22RR are supported by the suspension arms 20RL and 20RR, respectively.

The front wheel suspensions 18FL and 18FR include the shock absorbers 24FL and 24FR and the suspension springs 26FL and 26FR, respectively. Likewise, the rear wheel suspensions 16RL and 18RR include shock absorbers 24RL and 24RR and suspension springs 26RL and 26RR, respectively. Although damping coefficients of the shock absorbers 24FL to 24RR are constant, these shock absorbers may be shock absorbers of variable damping farce type.

In the illustrated embodiment, the shock absorbers 24FL and 24FR are respectively connected to the vehicle body 16 at the upper ends and to the wheel support members 22FL and 22FR at the lower ends. The suspension springs 26FL and 26FR are elastically mounted between the vehicle body 16 and the wheel support members 22FL and 22FR via the shock absorbers 24FL and 24FR, respectively. However, the shock absorber 24FL and the suspension spring 26FL may be disposed between the vehicle body 16 and the wheel support member 22FL or the suspension arm 20FL, and the shock absorber 24FR and the suspension spring 26FR may be disposed between the vehicle body 16 and the wheel support member 22FR or the suspension arm 20FR.

Likewise, the shock absorbers 24RL and 24RR are respectively connected to the vehicle body 16 at the upper ends and to the wheel support members 22RL and 22RR at the lower ends. The suspension springs 26RL and 26RR are elastically mounted between the vehicle body 16 and the wheel support members 22RL and 22RR via the shock absorbers 24RL and 24RR, respectively. However, the shock absorber 24RL and the suspension spring 26RL may be disposed between the vehicle body 16 and the wheel support member 22RL or the suspension arm 20RL, and the shock absorber 24RR and the suspension spring 26RR may be disposed between the vehicle body 16 and the wheel support member 22RR or the suspension arm 20RR.

The suspensions 18FL to 18RR may be suspensions of any type as long as they allow the wheels 12FL to 12RR and the vehicle body 16 to be displaced in the vertical direction with respect to each other, and the suspensions 18FL to 18RR may be independent suspension type suspensions. Further, the suspension springs 26 FL to 26RR may be arbitrary springs such as compression coil springs and air springs.

As can be understood from the above description, at least the vehicle body 16 constitutes the spring mass of the vehicle 14, and at least the wheels 12FL to 12RR and the wheel support members 22FL to 22RR constitute the unsprung masses of the vehicle 14.

Further, in the illustrated embodiment, wheel actuators 28FL to 28RR are provided between the vehicle body 16 and piston rods of the shock absorbers 24FL to 24RR, respectively. The wheel actuators 28FL to 28RR function as actuators that hydraulically or electromagnetically generate forces acting between the vehicle body and the wheels 12FL to 12RR. The wheel actuators 28FL to 28RR cooperate with the shock absorbers 24FL to 24RR, the suspension springs 26FL to 26RR, and the like to constitute active suspensions. The wheel actuators 28FL to 28RR may be any wheel actuators so long as they are controlled by an electronic control unit 30 as a control unit to generate forces acting between the vehicle body and the wheels.

As will be described in detail later, the damping control apparatus 10 of the embodiment is configured to suppress vibration of the sprung mass in three modes of heave, pitch and roll. Signals indicating a heave acceleration Gz, a pitch acceleration Gx, and a roll acceleration Gy of the vehicle body 16 as the sprung mass are input from a heave acceleration sensor 32, a pitch acceleration sensor 34, and a roll acceleration sensor 36, respectively, to the electronic control unit 30. The heave acceleration Gz, the pitch acceleration Gx, and the roll acceleration Gy are detected as positive when they are in the upward direction, in the forward direction, and in the clockwise direction as viewed in the forward direction, respectively.

The heave acceleration sensor 32, the pitch acceleration sensor 34 and the roll acceleration sensor 36 may be provided at or near the center of gravity of the vehicle 14. However, a plurality of acceleration sensors provided at positions other than the center of gravity of the vehicle may be provided, and a heave acceleration Gz, a pitch acceleration Gx, and a roll acceleration Gy at the center of gravity of the vehicle 14 may be calculated based on the detected values.

As will be described in detail later, the electronic control unit 30 controls target generative forces Fchj of the heave mode, target generative forces Fcpj of the pitch mode, and target generative forces Fcrj of the roll mode (j=fl, fr, rl and rr) in accordance with the control program corresponding to the flowcharts and the block diagrams shown in FIGS. 2 to 6. Further, the electronic control unit 30 calculates the final target generative forces Fcj (j=fl, fr, rl and rr) of the wheel actuators 28FL to 28RR as the sums of these target generative forces, and controls the wheel actuators so that generative forces Fj (j=fl, fr, rl and rr) of the respective wheel actuators become the corresponding final target generative forces Fcj. Notably, fl, fr, rl and rr respectively mean the front left wheel, the front right wheel, the rear left wheel and the rear right wheel.

Although not shown in detail in FIG. 1, the electronic control unit 30 includes a microcomputer and a driving circuit. The microcomputer has a general configuration in which a CPU, a ROM, a RAM, and an input/output port device are provided, and these are mutually connected by a bi-directional common bus. The control program for controlling the wheel actuators 28FL to 28RR is stored in the ROM, and the wheel actuators are controlled by the CPU according to the control program. The ROM stores the equivalent mass of the inerter, the damping coefficient of the damper, and the spring constant of the spring of the skyhook device of the single wheel model of the vehicle corresponding to FIG. 7 each preset for the heave mode, the pitch mode and the roll mode. Further, the ROM stores control gains $e_h$, $e_p$ and $e_r$ preset for the heave mode, the pitch mode, and the roll mode corresponding to the control gain e.

<Main Routine of Damping Control (FIG. 2)>

Figure 2:
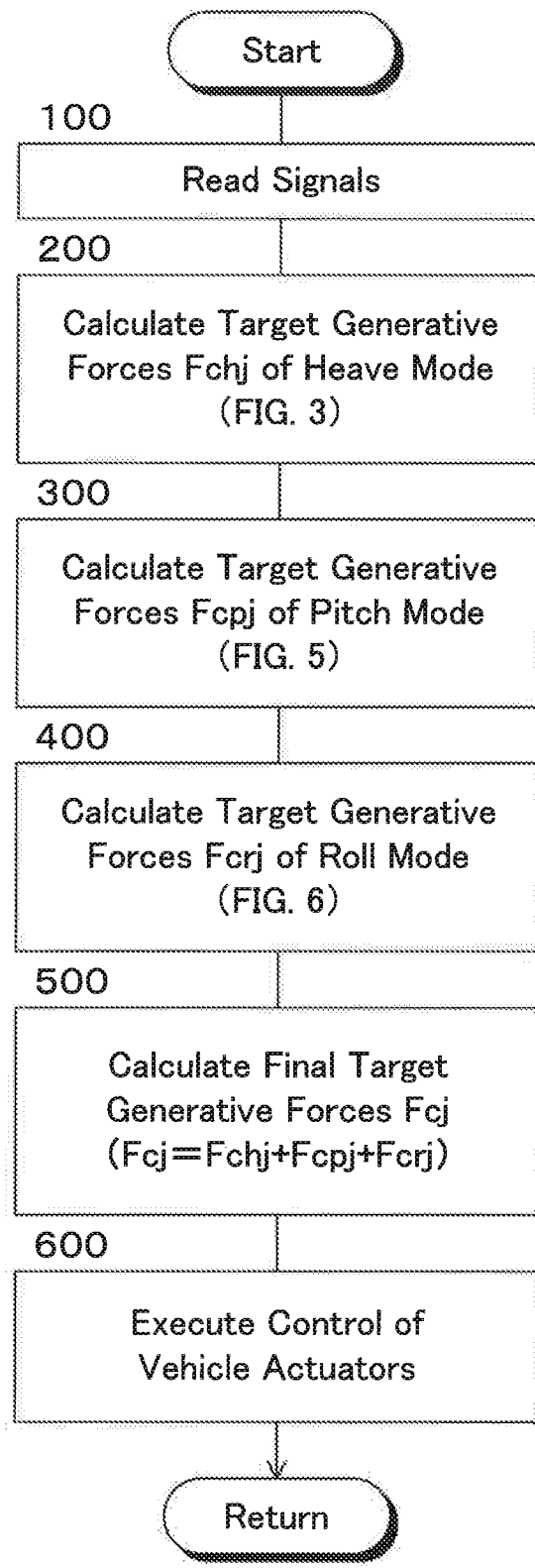
FIG. 2 is a flowchart showing a main routine of damping control in the embodiment.

Next, with reference to the flowchart shown in FIG. 2, the main routine of damping control in the embodiment will be described. The control according to the flowchart shown in FIG. 2 is repeatedly executed at predetermined time intervals by the electronic control unit 30 when an ignition switch (not shown) is ON.

First, in step 100, signals indicating a heave acceleration Gz, a pitch acceleration Gx, and a roll acceleration Gy of the vehicle body 16 detected by the heave acceleration sensor 32, the pitch acceleration sensor 34, and the roll acceleration sensor 36, respectively, are read.

Figure 3:
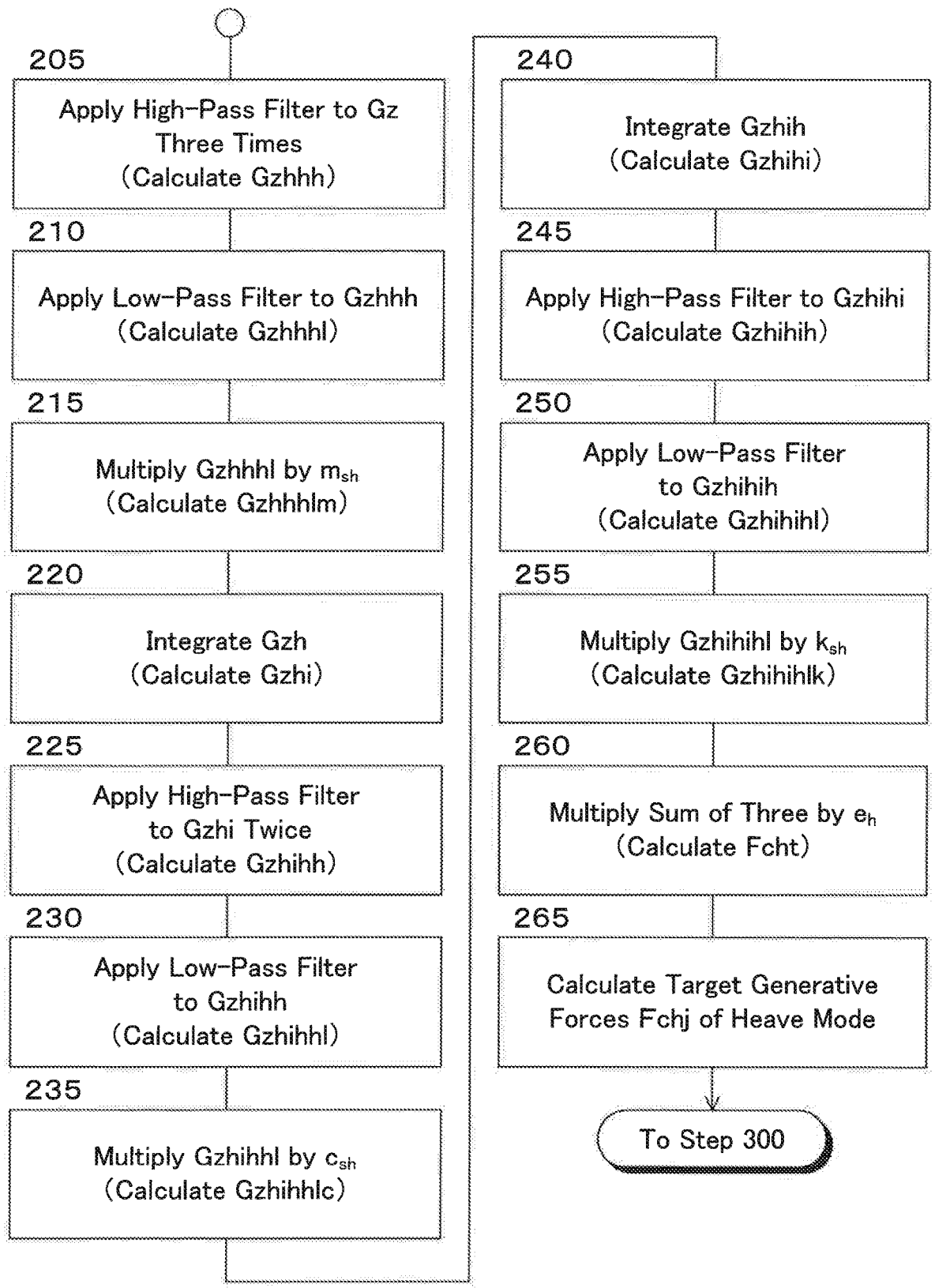
FIG. 3 is a flowchart showing a calculation routine of target control forces Fchj of the heave mode executed in step 200 of FIG. 2.

In step 200, target generative forces Fchj (j=fl, fr, rl and rr) of the heave mode of the wheel actuators 28FL to 28RR of the left and right front wheels and the left and right rear wheels are calculated according to the subroutine shown in FIG. 3.

Figure 5:
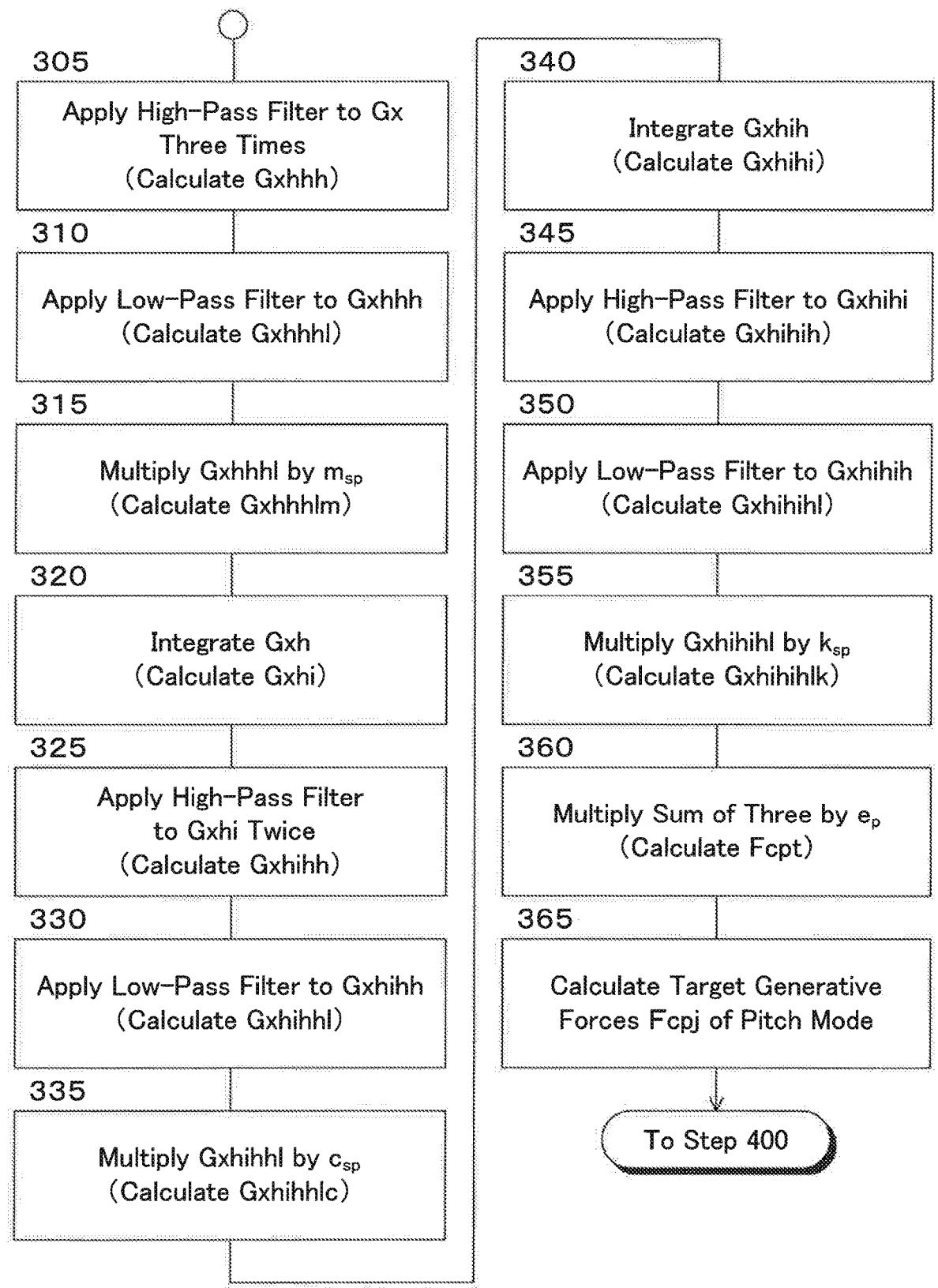
FIG. 5 is a flowchart showing a routine for calculating target control forces Fcpj of the pitch mode executed in step 300 of FIG. 2.

In step 300, target generative forces Fcpj (j=fl, fr, rl and rr) of the pitch mode of the wheel actuators 28FL to 28RR of the left and right front wheels and the left and right rear wheels are calculated according to the subroutine shown in FIG. 5.

Figure 6:
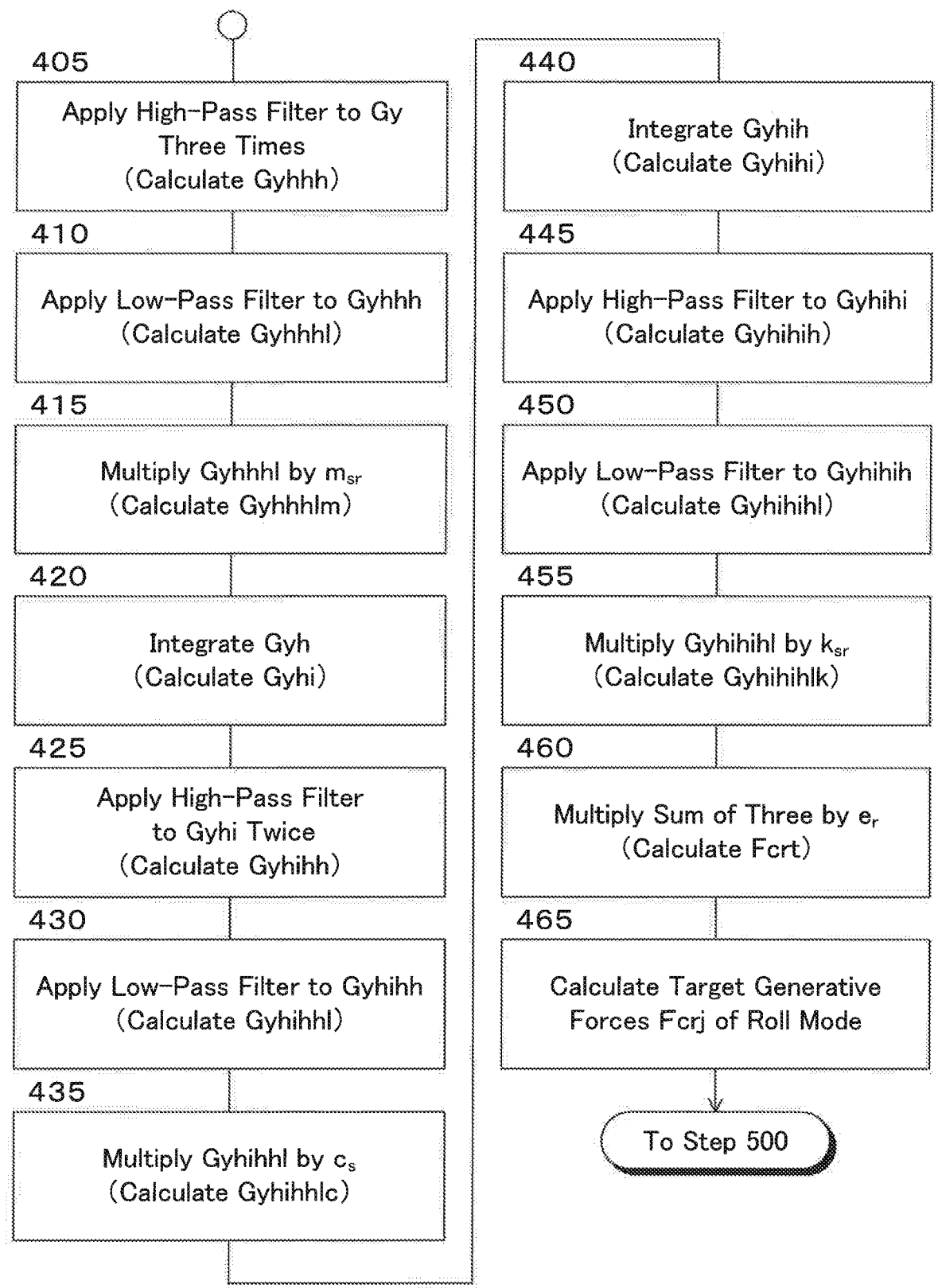
FIG. 6 is a flowchart showing a routine for calculating target control forces Fcrj of the roll mode executed in step 400 of FIG. 2.

In step 400, target generative forces Fcrj (j=fl, fr, rl and rr) of the roll mode of the wheel actuators 28FL to 28RR of the left and right front wheels and the right and left rear wheels are calculated according to the subroutine shown in FIG. 6.

In step 500, final target generative forces Fcj (j=fl, fr, rl and rr) of the wheel actuators 28FL to 28RR are calculated as sums of the target generative forces Fchj of the heave mode, the target generative forces Fcpj of the pitch mode and the target generative forces Fcrj of the roll mode.

In step 600, the wheel actuators 28FL to 28RR are controlled so that generative forces Fj (j=fl, fr, rl and rr) of the wheel actuators 28FL to 28RR become the corresponding final target generative forces Fcj.

<Calculation of Target Generative Forces Fchj of Heave Mode (FIG. 3)>

Next, referring to the flowchart shown in FIG. 3, the calculation of the target generative forces Fchj of the heave mode executed in step 200 will be described. Although not shown, in the drawings, the equivalent mass $m_{sh}$, the damping coefficient $c_{sh}$ and the spring constant $k_{sh}$ are the equivalent mass of the inerter, the damping coefficient of the damper, and the spring constant of the spring of the skyhook device in the single wheel model of the heave mode corresponding to the single wheel model shown in FIG. 7. The equivalent mass $m_{sh}$, the damping coefficient $c_{sh}$ and the spring constant $k_{sh}$ are determined based on the vehicle 14 to which the damping control apparatus of the embodiment is applied.

In step 205, the same high-pass filter is applied to the heave acceleration Gz of the vehicle body 16 three times, whereby a three times high-pass filtered heave acceleration Gzhhh is calculated.

In step 210, a low-pass filter is applied to the heave acceleration Gzhhh, so that a low-pass filtered heave acceleration Gzhhhl is calculated.

In step 216, a target damping force Gzhhhlm (=Gzhhhl× $m_{sh}$) to be generated by the inerter of the skyhook device is calculated by multiplying the heave acceleration Gzhhhl by the equivalent mass $m_{sh}$ of the inerter.

In step 220, a heave acceleration Gzh calculated by applying the high-pass filter once to the heave acceleration Gz of the vehicle body 16 in the above-described step 235 is integrated to calculate the heave speed Gzhi of the vehicle body 16.

In step 225, the same high-pass filter as the high-pass filter used in step 205 is applied twice to the heave speed Gzhi, so that a twice high-pass filtered heave speed Gzhihh is calculated.

In step 230, a low-pass filtered heave speed Gzhihhl is calculated by applying the same low-pass filter as the low-pass filter used in step 210 to the heave speed Gzhihh.

In step 235, a target damping force Gzhihhlc (=Gzhihhl× $c_{sh}$) to be generated by the damper of the skyhook device is calculated by multiplying the heave speed Gzhihhl by the damping coefficient $c_{sh}$ of the damper.

In step 240, a heave displacement Gzhihi of the vehicle body 16 is calculated by integrating the heave speed Gzhih calculated by applying the high-pass filter once to the heave speed Gzhi in step 225.

In step 245, a high-pass filtered heave displacement Gzhihih is calculated by applying the same high-pass filter as the high-pass filter used in step 205 to the heave displacement Gzhihi once.

In step 250, a low-pass filtered heave displacement is calculated by applying the same low-pass filter as the low-pass filter used in step 210 to the heave displacement Gzhihih.

In step 255, a target damping force Gzhihihlk (=Gzhihihl× $k_{sh}$) to be generated by the spring of the skyhook device is calculated by multiplying the heave displacement Gzhihihl by the spring constant $k_{sh}$ of the spring.

In step 260, a sum of the target damping forces Gzhhhlm, Gzhihhlc and Gzhihihk is multiplied by the control gain $e_h$ (a positive constant) of the heave mode corresponding to the above-mentioned constant value e according to the following equation (17) whereby a target generative force Fcht of the heave mode of the entire vehicle 14 is calculated. In the following equations (16) and (19). $I_f$ is a distance in the vehicle front-rear direction between a center of gravity (not shown) of the vehicle 14 and axles of the front wheels 12FL and 12FR, $I_r$ is a distance in the vehicle front-rear direction between the center of gravity of the vehicle 14 and axles of the rear wheels 12RL and 12RR.

$$Fcht = e_h(Gzhhhlm + Gzhihhlc + Gzhihihlk) \quad (17)$$

In step 265, target generative forces Fchj (=fl, fr, rl and rr) of the heave mode of the wheel actuators 28FL to 28RR of the left and right front wheels and the left and right rear wheels are calculated according to the following equations (18) and (19), $$Fchfl = Fchfr = \frac{I_r}{2(I_f + I_r)} Fcht \quad (18)$$

$$Fchrl = Fchrr = \frac{I_f}{2(I_f + I_r)} Fcht \quad (19)$$

<Block Diagram of Calculation of Target Generative Force Fchj (FIG. 4)>

Figure 4:
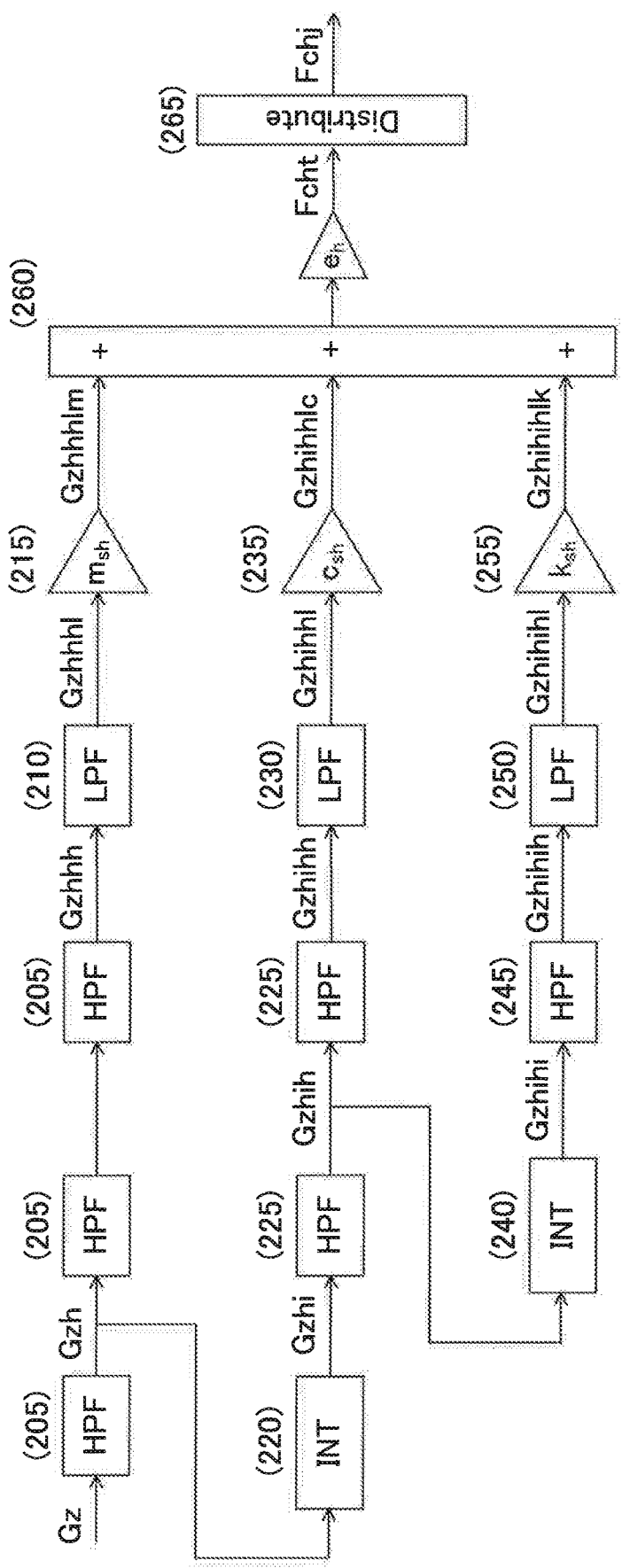
FIG. 4 is a block diagram showing signal processing by the calculation routine of the target control forces Fchj.

FIG. 4 is a block diagram showing signal processing by the calculation routine of the target generative forces Fchj. In FIG. 4, the same numbers as in steps 205 to 265 are attached in parentheses to the blocks corresponding to steps 205 to 265 in the flowchart shown in FIG. 3.

As shown in FIG. 4, it can be seen that the same high-pass filter is applied three times and the same low-pass filter is applied once to the heave acceleration, the heave speed and the heave displacement of the vehicle body 16. The heave acceleration, the heave speed and the heave displacement to which the high-pass filters and the low-pass filter are applied are respectively multiplied by the equivalent mass of the inerter, the damping coefficient of the damper, and the spring constant of the spring, whereby the target damping forces to be generated by the inerter, the damper and the spring are calculated. Furthermore, by multiplying a sum of the three target damping forces by the control gain, a target damping force Fcht of the heave mode of the entire vehicle 14 is calculated, and based on this target damping force, target generative forces Fchj of the heave mode of the wheel actuators 28FL to 28RR of the left and right front wheels and the left and right rear wheels are calculated.

<Calculation of Target Generative Force Fcpj in Pitch Mode (FIG. 5)>

Next, with reference to the flowchart shown in FIG. 5, the calculation of the target generative forces Fcpj of the pitch mode executed in the above step 300 will be described. Although not shown in the drawings, the equivalent mass $m_{sp}$, the damping coefficient $c_{sp}$ and the spring constant $k_{sp}$ are the equivalent mass of the inerter, the damping coefficient of the damper and the spring constant of the spring of the skyhook device in the single wheel mod& of the pitch mode corresponding to the single wheel model shown in FIG. 7. The equivalent mass $m_{sp}$, the damping coefficient $c_{sp}$ and the spring constant $k_{sp}$ are also determined based on the vehicle 14 to which the damping control apparatus of the embodiment is applied.

In step 305, the same high-pass filter is applied to the pitch acceleration Gx of the vehicle body 16 three times, whereby a three times high-pass filtered pitch acceleration Gxhhh is calculated. The high-pass filter in this step may be the same as the high-pass filter applied to the heave acceleration Gz in the aforementioned step 205, but it may be different from this.

In step 310, a low-pass triter is applied to the pitch acceleration Gxhhh to calculate a low-pass filtered pitch acceleration Gxhhhl. The low-pass filter in this step may be the same as the low-pass filter applied to the heave acceleration Gzhhh in step 210, but it may be different from this.

In step 315, a target damping force Gxhhhlm (=Gxhhhl× $m_{sp}$) to be generated by the inerter of the skyhook device is calculated by multiplying the pitch acceleration Gxhhhl by the equivalent mass $m_{sp}$ of the inerter.

In step 320, the pitch acceleration Gxh calculated by applying a single high-pass filter to the pitch acceleration Gx of the vehicle body 16 in the step 305 is integrated to calculate a pitch velocity Gxhi of the vehicle body 16.

In step 325, the same high-pass filter as the high-pass filter used in step 305 is applied twice to the pitch speed Gxhi to calculate a twice high-pass filtered pitch speed Gxhihh.

In step 330, a low-pass filtered pitch speed Gxhihhl is calculated by applying the same low-pass filter as the low-pass filter used in step 310 to the pitch speed Gxhihh.

In step 335, a target damping force Gxhihhlc (=Gxhihhl× $c_{sp}$) to be generated by the damper of the skyhook device is calculated by multiplying the pitch velocity Gxhihhl by the damping coefficient $c_{sp}$ of the damper.

In step 340, a pitch displacement Gxhihi of the vehicle body 16 is calculated by integrating the pitch speed Gxhih calculated by applying the high-pass filter once to the pitch speed Gxhi in step 325.

In step 345, a high-pass filtered pitch displacement Gxhihih is calculated by applying the same high-pass filter as the high-pass filter used in step 305 to the pitch displacement Gxhihi once.

In step 350, a low-pass filtered pitch displacement Gxhihihl is calculated by applying the same low-pass filter as the low-pass filter used step 310 to the pitch displacement Gxhihih.

In step 355, a target damping force Gxhihihlk (=Gxhihihl*$k_{sp}$) to be generated by the spring of the skyhook device is calculated by multiplying the pitch displacement Gxhihihl by the spring constant $k_{sp}$ of the spring.

In step 360, a sum of the target damping forces Gxhhhmm, Gxhihhlc and Gxhihihk is multiplied by the control gain $e_p$ (a positive constant) of the pitch mode corresponding to the above-mentioned constant value e according to the following equation (20), whereby a target damping force Fcpt of the pitch mode of the entire vehicle 14 is calculated. The control gain $e_p$ may be the same value or a different value as the control gain $e_h$.

$$Fcpt=e_p(Gxlihhim+Gxhihhlc+Gxhihihlk) \quad (20)$$

In step 365, target generative forces Fcpj (j=fl, fr, rl and rr) of the pitch mode of the wheel actuators 28FL to 28RR of the left and right front wheels and the left and right rear wheels are calculated according to the following equations (21) and (22).

$$Fcpfl = Fcpfr = \frac{1}{4}Fcpt \quad (21)$$

$$Fcprl = Fcprr = -\frac{1}{4}Fcpt \quad (22)$$

<Calculation of Target Generative Force Fcrj in Roll Mode (FIG. 6)>

Next, referring to the flowchart shown in FIG. 6, the calculation of the target generative forces Fcrj of the roll mode executed in the above step 400 will be described. Although not shown in the drawings, the equivalent mass $m_{sr}$, the damping coefficient $c_{sr}$ and the spring constant $k_{sr}$ are the equivalent mass of the inerter, the damping coefficient of the damper and the spring constant of the spring of the skyhook device in the single wheel model of the roll mode corresponding to the single wheel model shown in FIG. 7. The equivalent mass $m_{sr}$, the damping coefficient $c_{sr}$ and the spring constant $k_{sr}$ are also determined based on the vehicle 14 to which the damping control apparatus of the embodiment is applied.

In step 405, the same high-pass filter is applied to the roll acceleration Gy of the vehicle body 16 three times, whereby a three times high-pass filtered roll acceleration Gyhhh is calculated. The high-pass filter in this step may be the same as the high-pass filter applied to the heave acceleration $G_2$ in the aforementioned step 205, but it may be different from this.

In step 410, a low-pass filter is applied to the roll acceleration Gyhhh to calculate a low-pass filtered roll acceleration Gyhhhl. The low-pass filter in this step may be the same as the low-pass filter applied to the heave acceleration Gzhhh in step 210 but it may be different from this.

In step 415, a target damping force Gyhhhlm (=Gyhhhl× $m_{sr}$) to be generated by the inerter of the skyhook device is calculated by multiplying the roll acceleration Gyhhhl by the equivalent mass $m_{sr}$ of the inerter.

In step 420, the roll acceleration Gyh calculated by applying a single high-pass filter to the roll acceleration Gy of the vehicle body 16 in the step 405 is integrated to calculate a roll velocity Gyhi of the vehicle body 16.

In step 425, the same high-pass filter as the high-pass filter used in step 405 is applied twice to the roll speed Gyhi to calculate a twice high-pass filtered roll speed Gyhihh.

In step 430, a low-pass filtered roll speed Gyhihhl is calculated by applying the same low-pass filter as the low-pass filter used in step 410 to the roll speed Gyhihh.

In step 435, a target damping force Gyhihhlc (=Gyhihhl× $c_{sr}$) to be generated by the damper of the skyhook device is calculated by multiplying the roll velocity Gyhihhl by the damping coefficient $c_{sr}$ of the damper.

In step 440, a roll displacement Gyhihi of the vehicle body 16 is calculated by integrating the roll speed Gyhih calculated by applying the high-pass filter once to the roll speed Gyhi in step 425.

In step 445, a high-pass filtered roll displacement Gyhihih is calculated by applying the same high-pass filter as the high-pass filter used in step 405 to the roll displacement Gyhihi once.

In step 450, low-pass filtered roll displacement Gyhihihl is calculated by applying the same low-pass filter as the low-pass filter used in step 410 to the roll displacement Gyhihih.

In step 455, a target damping force Gyhihihlk (=Gyhihihl*$k_{sr}$) to be generated by the spring of the skyhook device is calculated by multiplying the roll displacement Gyhihihl by the spring constant $k_{sr}$ of the spring.

In step 460, a sum of the target damping forces Gyhhhmm, Gyhihhlc and Gyhihihk is multiplied by the control gain $e_r$ (a positive constant) of the roll mode corresponding to the above-mentioned constant value e according to the following equation (23), whereby a target damping force Fcrt of the roll mode of the entire vehicle 14 is calculated. The control gain $e_r$ may be the same value or a different value as the control gain $e_h$ or $e_p$.

$$Fcrt=e_r(Gyhhlm+Gyhihhlc+Gyhthihik) \quad (23)$$

In step 465, target generative forces Fcrj (j=fl, fr, rl and rr) of the roll mode of the wheel actuators 28FL to 28RR of the left and right front wheels and the left and right rear wheels are calculated according to the following equations (24) and (25)

$$Fcrfl = Fcrrl = -\frac{1}{4}Fcrt \quad (24)$$

$$Fcrfr = Fcrrr = \frac{1}{4}Fcrt \quad (25)$$

Block diagrams showing the signal processes by the calculation routine of the pitch mode target generative forces Fcpj and roll mode target generative forces Fcrj are the same as the block diagram of the calculation of the target generative forces Fchj shown in FIG. 4. Therefore, illustration of the block diagrams showing the calculation processes of the target generative forces Fcpj in the pitch mode and the target generative forces Fcrj in the roll mode is omitted.

As can be understood from the above explanation, in steps 200, 300 and 400, respectively, target generative forces Fchj of the heave mode, target generative forces Fcpj of the pitch mode, and target generative forces Fcrj of the roll mode of the wheel actuators 28FL to 28RR are calculated. In step 500, final target generative forces Fcj of the wheel actuators 28FL to 28RR are calculated as sums of the target generative forces Fchj of the heave mode, the target generative forces Fcpj of the pitch mode, and the target generative forces Fcrj of the roll mode. Further, in step 600, the wheel actuators 28FL to 28RR are controlled so that the generative forces. Fj of the wheel actuators 28FL to 28RR become the corresponding final target generative forces Fcj, respectively.

In the calculation of the target generative forces Fchj of the heave mode, as shown in FIGS. 3 and 4, the same high-pass filter is applied three times and the same low-pass filter is applied once to the heave acceleration, the heave speed and the heave displacement of the vehicle body 16. The heave acceleration, the heave speed and the heave displacement to which the high-pass filter and the low-pass filter were applied are multiplied by the equivalent mass of the inerter, the damping coefficient of the damper, and the spring constant of the spring, respectively, whereby target damping forces to be generated by the inerter, the damper and the spring are calculated. Further, by multiplying a sum of the three target damping forces by the control gain, a target generative force Fcht of the heave mode of the entire vehicle 14 is calculated, and based on the target generative force, target generative forces Fchj of the heave mode of the wheel actuators 28FL to 28RR are calculated.

In the calculation of the target generative forces Fcpj of the pitch mode, as shown in FIG. 5, the same high-pass filter is applied three times and the same low-pass filter is applied once to the pitch acceleration, the pitch speed and the pitch displacement of the vehicle body 16. The pitch acceleration, the pitch speed and the pitch displacement to which the high-pass filter and the low-pass filter were applied are multiplied by the equivalent mass of the inerter, the damping coefficient of the damper, and the spring constant of the spring, respectively, whereby target damping forces to be generated by the inerter, the damper and the spring are calculated. Further, by multiplying a sum of the three target damping forces by the control gain, a target generative force Fcpt of the pitch mode of the entire vehicle 14 is calculated, and based on the target generative force, target generative forces Fcpj of the pitch mode of the wheel actuators 28FL to 28RR are calculated.

Further, in the calculation of the target generative forces Fcrj of the roll mode, as shown in FIG. 6, the same high-pass filter is applied three times and the same low-pass filter is applied once to the roll acceleration, the roll speed and the roll displacement of the vehicle body 16. The roll acceleration, the roll speed and the roll displacement to which the high-pass filter and the low-pass filter were applied are multiplied by the equivalent mass of the inerter, the damping coefficient of the damper, and the spring constant of the spring, respectively, whereby target damping forces to be generated by the inerter, the damper and the spring are calculated. Further, by multiplying a sum of the three target damping forces by the control gain, a target generative force Fcrt of the roll mode of the entire vehicle 14 is calculated, and based on the target generative force, target generative forces Fcrj of the roll mode of the wheel actuators 28FL to 28RR are calculated.

Therefore, according to the above embodiment, in each of the heave mode, the pitch mode and the roll mode, a value obtained by multiplying a sum of a product of the acceleration of the vehicle body 16 and the equivalent mass of the inerter, a product of the once integrated value of the acceleration and the damping coefficient of the damper, and a product of the twice integrated value of the acceleration and the spring constant of the spring by the control gain is calculated as a target damping force to be applied on the sprung mass. Further, based on the three target damping forces, target generative forces of the wheel actuators 28FL to 28RR are calculated, and the wheel actuators are controlled so that forces generated by the wheel actuators become the corresponding target generative forces.

As described above, a value obtained by multiplying a sum of the above three products by the control gain is a value that can reduce the vibration of the vehicle body 16 caused by disturbances of the wheel support members 22FL to 22RR from a road surface. In addition, this value is calculated based on accelerations of the vehicle body without requiring accelerations of the wheels. Therefore, according to the embodiment, vibration of the vehicle body 16 can be reduced and damped without requiring detecting accelerations of the wheels.

Figure 9:
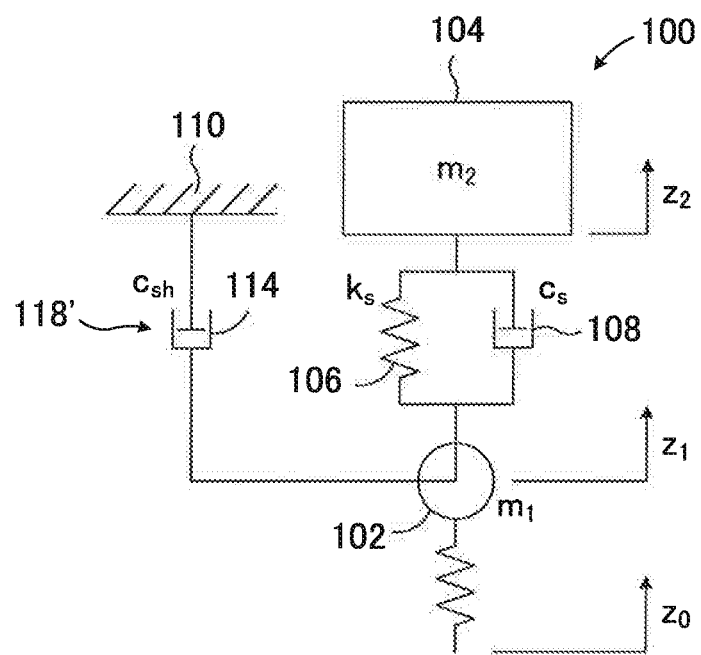
FIG. 9 is a view showing a single wheel vehicle model used in a reverse skyhook damper control by a conventional damping control apparatus.
Figure 10:
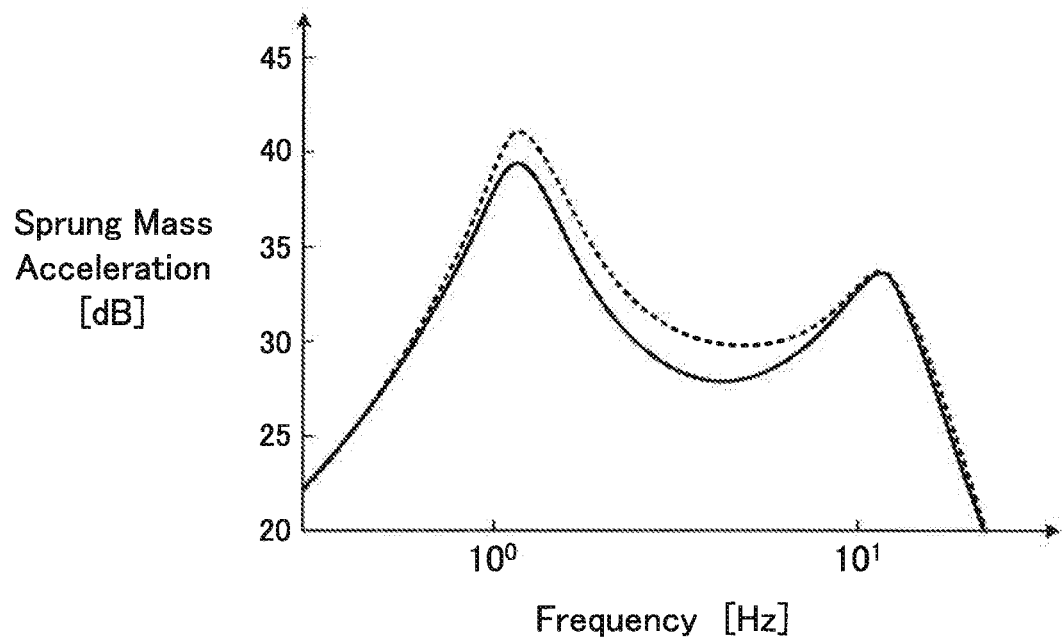
FIG. 10 is a board diagram showing a relationship between a sprung mass acceleration of the heave mode caused by a road surface input and a frequency with respect to the damping control apparatus of the present disclosure.
Figure 11:
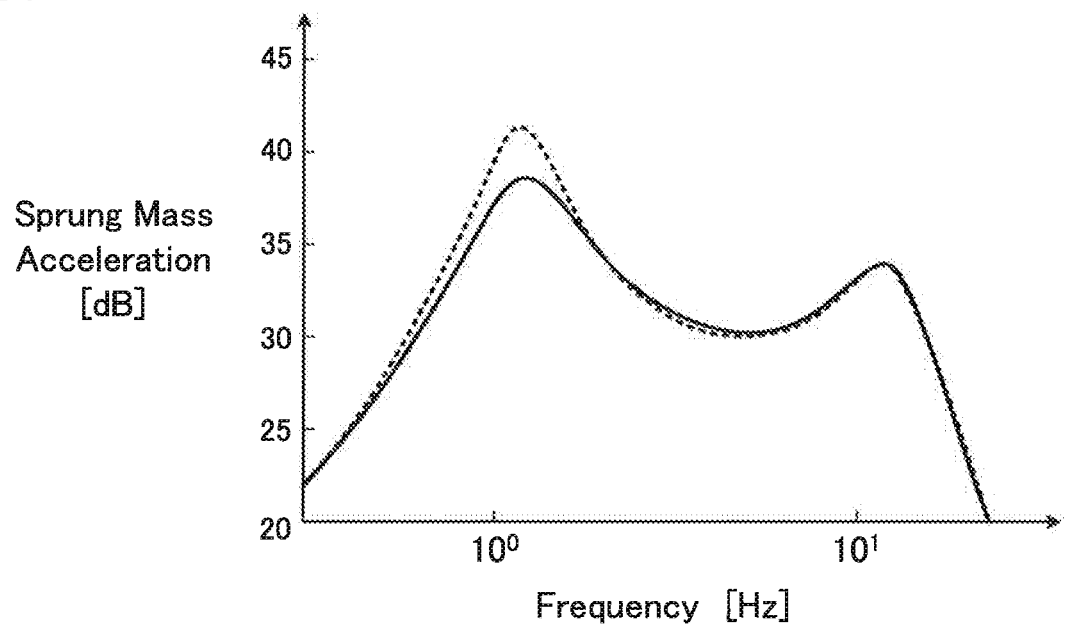
FIG. 11 is a board diagram showing a relationship between a sprung mass acceleration of the heave mode caused by a road surface input and a frequency with respect to a conventional damping control apparatus that performs a skyhook damper control.
Figure 12:
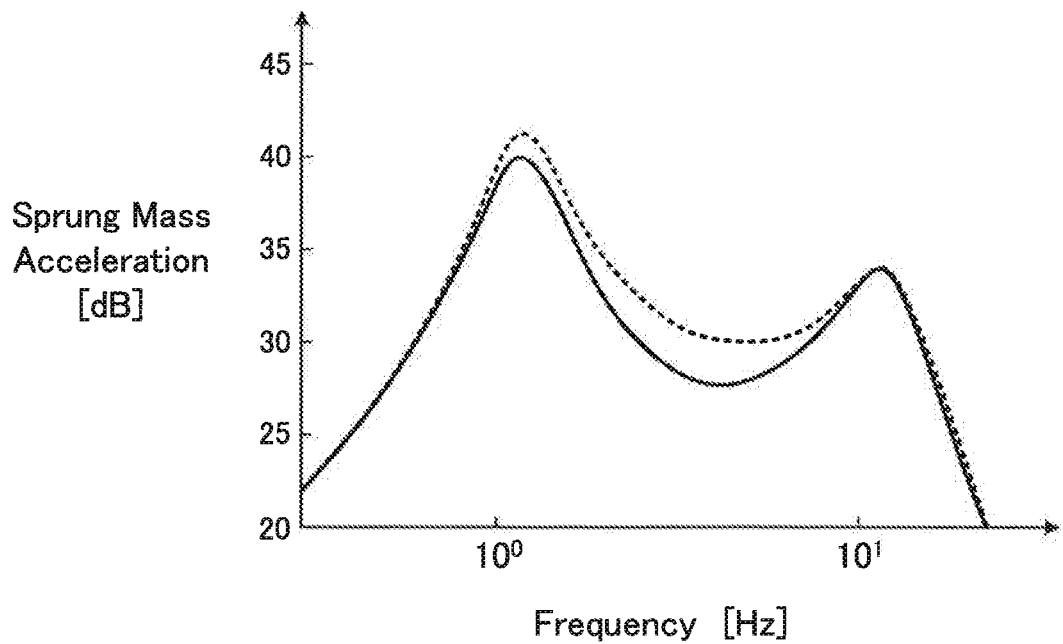
FIG. 12 is a board diagram showing a relationship between a sprung mass acceleration of the heave mode caused by a road surface input and a frequency with respect to a conventional damping control apparatus that performs a reverse skyhook damper control.

FIG. 10 is a Bode diagram showing a relationship between a sprung mass acceleration of the heave mode caused by a road surface input and a frequency with respect to the damping control apparatus of the present disclosure. On the other hand, FIG. 11 is a Bode diagram showing a relationship between the sprung mass acceleration of the heave mode caused by a road surface input and a frequency with respect to a conventional damping control apparatus that performs the skyhook damper control based on the single wheel vehicle model shown in FIG. 8. Further, FIG. 12 is a Bode diagram showing a relationship between the sprung mass acceleration of the heave mode caused by a road surface input and a frequency with respect to the conventional damping control apparatus that performs the reverse skyhook damper control based on the single wheel vehicle model shown in FIG. 9.

Figure 8:
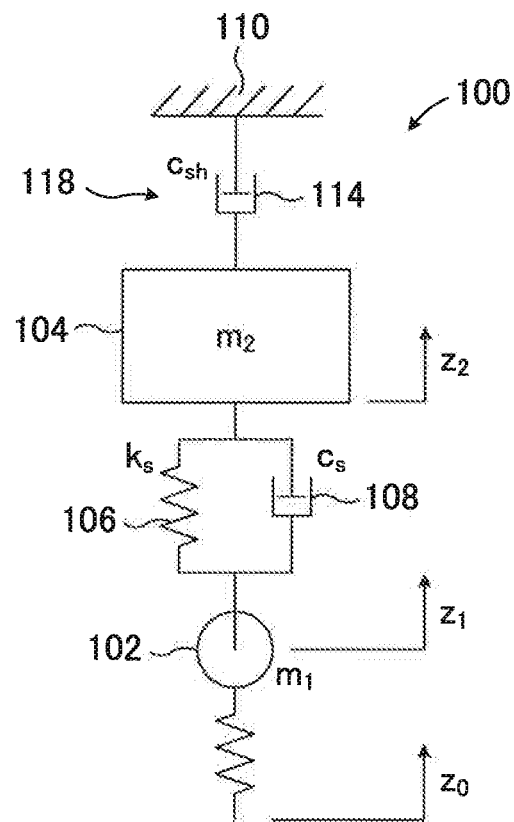
FIG. 8 is a view showing a single wheel vehicle model used in a skyhook damper control by a conventional damping control apparatus.

In FIGS. 8 and 9, members corresponding to members of the single wheel vehicle model shown in FIG. 7 are given the same reference numerals as those denoted in FIG. 7. Particularly in FIG. 9, reference numeral 118' denotes an inverse skyhook device. In FIGS. 10 to 12, broken lines are Bode diagrams showing the relationship when forces acting between the vehicle body and the wheels are not controlled.

It can be seen from FIG. 10 that according to the embodiment, as compared to where forces acting between the vehicle body and the wheels are not controlled, it is possible to effectively damp vibration of the vehicle body 16 at a resonance frequency of the vehicle body and the frequencies in the vicinity thereof and in the frequency range between the resonance frequency of the vehicle body and a resonance frequency of the wheels. It can be seen from the comparison between FIGS. 10 and 11 that according to the embodiment, vibration of the vehicle body in the frequency range between the resonance frequency of the vehicle body 16 and the resonance frequency of the wheels can be effectively suppressed as compared with the conventional damping control apparatus that performs the skyhook damper control. Further, it can be seen from the comparison between FIGS. 10 and 12 that according to the embodiment, vibration of the vehicle body at the resonance frequency of the vehicle body 16 and the frequencies in the vicinity thereof can be effectively suppressed as compared with the conventional damping control apparatus that performs the reverse skyhook damper control.

Therefore, according to the embodiment in comparison with the case where forces acting between the vehicle body and the wheels are not controlled and in comparison with the conventional damping control device, the vibration of the vehicle body at the resonance frequency of the vehicle body and in the frequency range between the resonance frequency of the vehicle body and the resonance frequency of the wheels can be effectively damped.

Further, according to the embodiment, in all of the heave mode, the pitch mode and the roll mode, the same high-pass filter is applied to the acceleration, the once integrated value and twice integrated value the same number of times. Therefore, adverse effects due to an integral offset can be eliminated by the high-pass filter. In addition, as compared to where different high-pass filters are applied to acceleration and the like and where the same high-pass filter is applied to acceleration and the like for different times, the damping force based on the acceleration, the once integrated value and the twice integrated value, it is possible to reduce the possibility of occurrence of a phase shift and to improve the damping performance of the vehicle body.

Further, according to the embodiment, in all of the heave mode, the pitch mode and the roll mode, the same high-pass filter is applied to the acceleration, the once integrated value and the twice integrated value. Therefore, acceleration and the like can be processed so as to eliminate high frequency noise and to cope with delay in control of the electronic control unit 30 and the wheel actuators 28FL to 28RR. In addition, as compared to where different low-pass filters are applied to the acceleration, the once integrated value and the twice integrated value and where the low-pass filter is applied to the acceleration, the once integrated value and the twice integrated value, it is possible to reduce the possibility that errors due to high-frequency noise and deviations in control timing occur in the damping forces based on the acceleration, the once integrated value and the twice integrated value, thereby improving the damping performance of the vehicle body.

In particular, according to the embodiment, target generative forces Fchj of the heave mode, target generative forces Fcpj of the pitch mode, and target generative forces Fcrj of the roll mode are calculated as target generative forces of the damping control. Further, final target generative forces Fcj of the wheel actuators 28FL to 28RR are calculated as sums of these target generative forces and generative forces of the wheel actuators 28FL to 28RR are controlled so as to conform to the corresponding final target generative forces Fcj. Therefore, since a final target generative force is calculated as a sum of the target generative forces of the three modes for each wheel actuator, vibration of the vehicle body can be suppressed as compared to where a final target generative force is the target generative force of one or two modes.

Although the present disclosure has been described in detail with reference to the specific embodiment, it will be apparent to those skilled in the art that the present disclosure is not limited to the above-described embodiment, and various other embodiments are possible within the scope of the present disclosure.

For example, in the above-described embodiment, target control forces Fchj of the heave mode, target control forces Fcpj of the pitch mode, and target control forces Fcrj of the roll mode are calculated as the target control forces of the damping control and final target control forces Fcj of the wheel actuators 28FL to 28RR are calculated as the sums of these target control forces. However, at least one of the target control forces Fchj of the heave mode, the target control forces Fcpj of the pitch mode, and the target control forces Fcrj of the roll mode may be omitted.

Conversely, a single wheel model of a vehicle shown in FIG. 7 may be set for the yaw mode so that vibration of the sprung in the yaw direction is suppressed, a yaw acceleration of the sprung may be detected, and based on the yaw acceleration, target control forces Fcmj of the yaw mode may be calculated in the same manner as the target control forces Fchj and the like. Further, damping forces in the yaw direction may be controlled based on the target control forces Fcmj of the yaw mode, for example, by controlling a steered angle of the steerable wheels by an electric power steering apparatus or by controlling a difference between braking/driving forces of the left and right wheels.

Further, in the above-described embodiment, the actuators that generate forces acting between the vehicle body and the wheels are wheel actuators that generate forces acting between the vehicle body and the piston rods of the shock absorbers. However, as described in the above-mentioned Japanese Patent Application Laid-open No. 2016104605, each actuator may be a braking/driving force control type actuator that utilizes the fact that a braking/driving force of a wheel is converted into a vertical force acting on the vehicle body by a suspension, that is, a braking device, a driving device such as an in-wheel motor, and a control unit that controls them. When the actuators are braking/driving force control type actuators, target braking/driving forces for generating vertical forces corresponding to the final target generative forces Fcj may be calculated, and a braking/driving force of each wheel may be controlled so that a braking/driving force based on braking/driving operation of a driver is corrected with the target braking/driving force.

Furthermore, the actuator may be a combination such as a combination of a wheel actuator and a braking/driving force control type actuator, and at least a part of a damping force of the roll mode may be generated as an anti-roll force by controlling an active stabilizer, for example.

In particular, in the braking/driving force control type actuator, the damping control forces of the heave mode are generated by controlling the actuators so that the braking/driving forces of all the wheels become the same phase, and the damping forces of the pitch mode are generated by controlling the actuators so that the braking/driving forces of the front and rear wheels become the opposite phases. In addition, the damping forces of the roll mode are generated by controlling the actuators so that the braking/driving forces of the front and rear wheels become the same phases and the braking/driving forces of the left and right wheels become the opposite phases. Furthermore, the damping forces of the yaw mode are generated by controlling the actuators so that the braking/driving forces of the left and right wheels become the opposite phases, or by controlling the actuators so that the braking force or driving force is applied to only one of the left and right wheels.

In the above embodiment, the same high-pass filter is applied three times to acceleration, velocity and displacement in all of the heave mode, the pitch mode and the roll mode. However, the number of times the high-pass filter is applied to acceleration, velocity and displacement may be modified to twice by omitting the high-pass filter applied for acceleration, for example.

Furthermore, at least one high-pass filter may be different from the other high-pass filters, and the high-pass filters applied to acceleration, velocity and displacement may be different from each other. In these cases, although the damping performance is slightly lower than that in the embodiment, vibration of the vehicle body can be damped without requiring detecting accelerations of the wheels.

In the above embodiment, in all of the heave mode, the pitch mode and the roll mode, the same low-pass filter is applied to acceleration, velocity and displacement. However, low-pass filters applied to acceleration, velocity and displacement may be different from each other. In this case, although the damping performance is slightly lowered a compared with the embodiment, vibration of the vehicle body can be damped without requiring detecting accelerations of the wheels.

Furthermore, in the above embodiment, target control forces are calculated for the heave mode, the pitch mode and the roll mode corresponding to the up-down direction, the front-back direction, and the lateral direction of the vehicle, which are the directions of the orthogonal coordinates. However, the damping mode of the sprung mass may be set for directions of an oblique coordinate or directions of a polar coordinate.

What is claimed is:

1. A damping control apparatus for a vehicle having an acceleration detection device for detecting an acceleration of a vehicle body for a vibration mode of the vehicle body to be damped, actuators for generating forces acting between the vehicle body and wheels, and a control unit for controlling the actuators, and the control unit stores an equivalent mass of an inerter, a damping coefficient of a damper, and a spring constant of a spring of a skyhook device that skyhooks a sprung mass of a single wheel vehicle model for the vibration mode via the inerter, the damper, and the spring, wherein the control unit is configured to: calculate, as a target damping force to be applied to the sprung mass with respect to the vibration mode, a value obtained by multiplying by a control gain a sum of a product of an acceleration detected by the acceleration detection device and the equivalent mass of the inerter, a product of a once integrated value of the acceleration and the damping coefficient of the damper, a product of a twice integrated value of the acceleration and the spring constant of the spring; calculate a target generative force of each actuator based on the target damping force; and control each actuator so that a force generated by the actuator becomes the target generative force corresponding to each actuator.

2. The damping control apparatus for a vehicle according to claim 1, wherein the control unit is configured to apply a high-pass filter to the acceleration, the once integrated value and the twice integrated value so that the high-pass filter is applied to the acceleration, the once integrated value, and the twice integrated value each at least twice and each an equivalent number of times.

3. The damping control apparatus for a vehicle according to claim 1, wherein the control unit is configured to apply the low-pass filter to the acceleration, the once integrated value, and the twice integrated value.

4. The damping control apparatus for a vehicle according to claim 1, wherein the vibration mode includes at least two of a heave mode, a roll mode and a pitch mode; the actuators includes four wheel actuators provided corresponding to a left front wheel, a right front wheel, a right rear wheel, and a left rear wheel; and the control unit is configured to: calculate target generative forces of the four wheel actuators for each mode; calculate a sum of the target generative forces of at least two modes for each wheel actuator as a final target generative force; and control each wheel actuator so that a force generated by each wheel actuator conform to the final target generative force corresponding to each wheel actuator.

* * * * *